United States Patent
Yanagida

(10) Patent No.: US 9,223,328 B2
(45) Date of Patent: Dec. 29, 2015

(54) SWITCHING REGULATOR, CONTROL CIRCUIT AND CONTROL METHOD THEREOF, AND ELECTRONIC APPARATUS

(71) Applicant: ROHM CO., LTD., Kyoto (JP)

(72) Inventor: Osamu Yanagida, Kyoto (JP)

(73) Assignee: ROHM CO., LTD. (JP)

( * ) Notice: Subject to any disclaimer, the term of this patent is extended or adjusted under 35 U.S.C. 154(b) by 134 days.

(21) Appl. No.: 14/026,127

(22) Filed: Sep. 13, 2013

(65) Prior Publication Data

US 2014/0070781 A1    Mar. 13, 2014

(30) Foreign Application Priority Data

Sep. 13, 2012  (JP) ................................ 2012-201965

(51) Int. Cl.
   *G05F 1/00*   (2006.01)
   *G05F 1/10*   (2006.01)
(52) U.S. Cl.
   CPC ........................................ *G05F 1/10* (2013.01)
(58) Field of Classification Search
   CPC ..................... H02M 3/156; H02M 2001/0045; H02M 3/1588
   USPC ............... 363/16–20, 25–26, 65, 72, 97, 127; 323/282–288, 207, 258
   See application file for complete search history.

(56) References Cited

U.S. PATENT DOCUMENTS

| | | | | |
|---|---|---|---|---|
| 7,498,791 | B2 * | 3/2009 | Chen | 323/284 |
| 7,508,177 | B2 * | 3/2009 | Aiura et al. | 323/268 |
| 7,834,604 | B2 * | 11/2010 | Soenen et al. | 323/282 |
| 8,106,634 | B2 * | 1/2012 | Hojo et al. | 323/222 |
| 2008/0303492 | A1 * | 12/2008 | Aiura et al. | 323/270 |

* cited by examiner

*Primary Examiner* — Rajnikant Patel
(74) *Attorney, Agent, or Firm* — Cantor Colburn LLP

(57) ABSTRACT

A control circuit for controlling a switching transistor and a synchronous rectifying transistor of a switching regulator includes: a bottom detection comparator configured to assert an on signal; an off signal generator configured to assert an off signal; a zero current detector configured to assert a zero current detection signal; and a control logic part configured to receive the on signal, the off signal and the zero current detection signal and generate a control signal such that the control circuit (i) transitions to a first state where, when the on signal is asserted, (ii) transitions to a second state where, when the off signal is asserted, and (iii) transitions to a third state where, when the zero current detection signal is asserted; In the third state, the control logic part reduces an operation current of at least a portion of the control circuit.

18 Claims, 14 Drawing Sheets

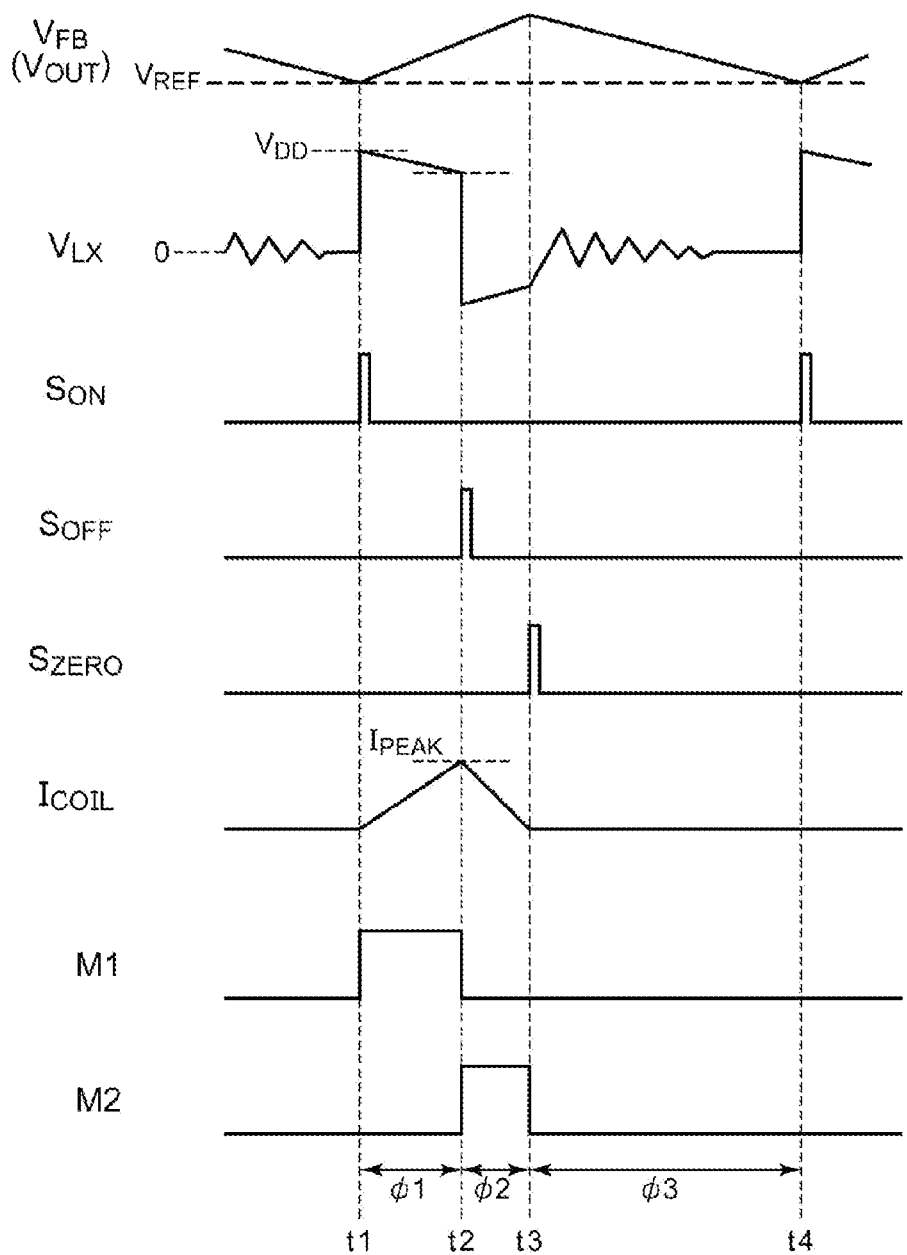

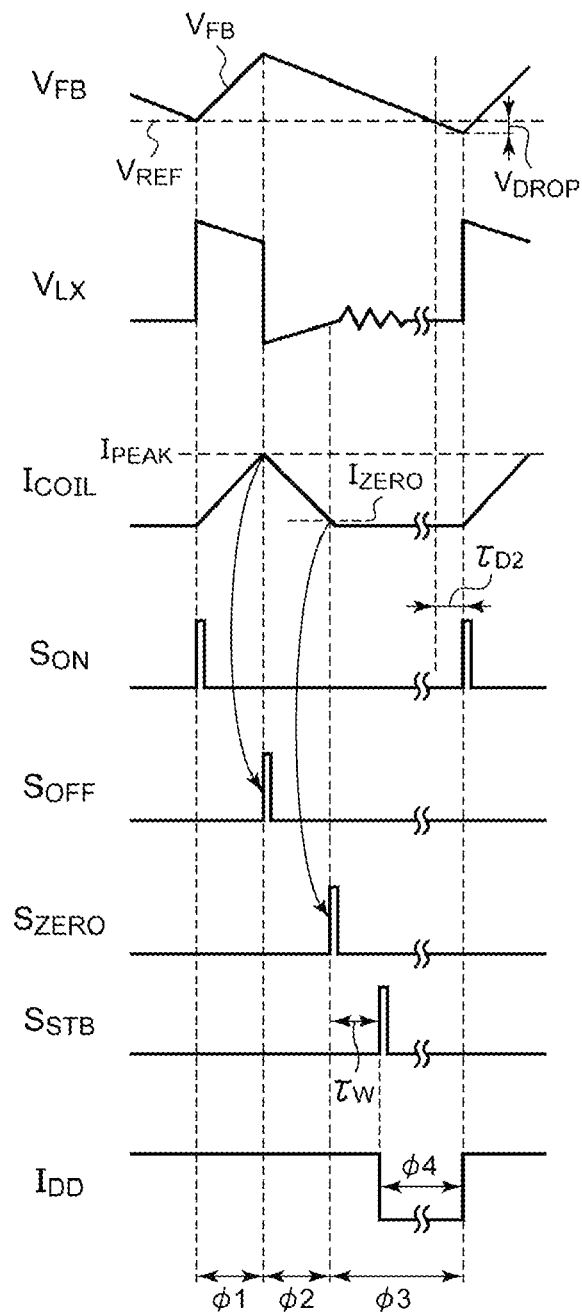

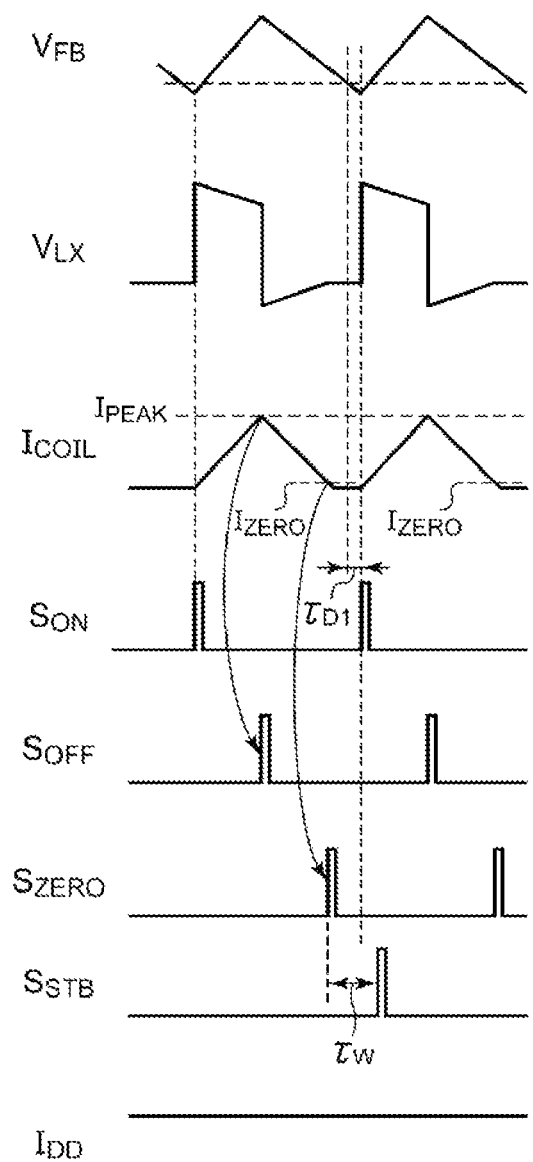

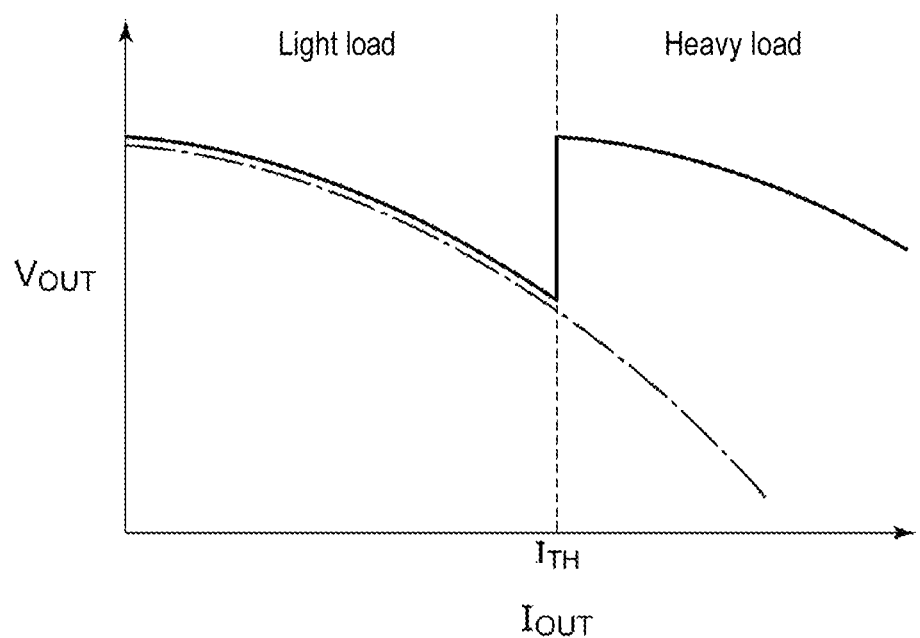

500

600

SWITCHING REGULATOR, CONTROL CIRCUIT AND CONTROL METHOD THEREOF, AND ELECTRONIC APPARATUS

CROSS-REFERENCE TO RELATED APPLICATION

This application is based upon and claims the benefit of priority from Japanese Patent Application No. 2012-201965, filed on Sep. 13, 2012, the entire contents of which are incorporated herein by reference.

TECHNICAL FIELD

The present disclosure relates to a switching regulator and a control circuit thereof.

BACKGROUND

Recent electronic apparatuses such as personal digital assistants (PDAs) and so on are equipped with devices requiring a power source voltage higher or lower than a battery voltage. A step-up, step-down or step-up/step-down type switching regulator is used to supply a proper power source voltage to such devices.

FIG. 1 is a circuit diagram showing a switching regulator $4r$. The switching regulator $4r$ includes a control circuit $100r$ and an output circuit 102. The output circuit 102 includes a switching transistor M1, a synchronous rectifying transistor M2, an inductor L1 and an output capacitor C and has a topology of a step-down type switching regulator. The control circuit $100r$ switches the switching transistor M1 and the synchronous rectifying transistor M2 to stabilize an output voltage $V_{OUT}$ to a target value.

The control circuit $100r$ includes a bottom detection comparator 10, a driving circuit $20r$, an off signal generator 50 and a zero current detector 60 in order to stabilize the output voltage for a light load. A first voltage-dividing resistor R1 and a second voltage-dividing resistor R2 divide the output voltage $V_{OUT}$ to generate a feedback voltage $V_{FB}$ based on the output voltage $V_{OUT}$. The bottom detection comparator 10 compares the feedback voltage $V_{FB}$ with a predetermined reference voltage $V_{REF}$ and generates an on signal $S_{ON}$ asserted (for example, having a high level) when the feedback voltage $V_{FB}$ decreases to the reference voltage $V_{REF}$.

The off signal generator 50 includes a current detector 52 and a peak current detection comparator 54 and asserts an off signal $S_{OFF}$ when current $I_{M1}$ flowing into the switching transistor M1 reaches a predetermined peak current $I_{PEAK}$.

In an on period of the switching transistor M1, a voltage $V_{LX}$ of a junction point (a switching terminal LX) of the switching transistor M1 and the synchronous rectifying transistor M2 is given by $V_{DD}-I_{M1} \times R_{ON1}$. Where, $R_{ON1}$ denotes an on resistor of the switching transistor M1. The current detector 52 generates a detection voltage $V_{IM1}$ depending on a voltage drop ($I_{M1} \times R_{ON1}$) of the switching transistor M1.

The peak current detection comparator 54 compares the detection voltage $V_{IM1}$ with a threshold voltage $V_{PEAK}$ corresponding to the peak current $I_{PEAK}$ and asserts the off signal $S_{OFF}$ (for example, having a high level) when the detection voltage $V_{IM1}$ reaches the threshold voltage $V_{PEAK}$, in other words, when the current $I_{M1}$ reaches the predetermined peak current $I_{PEAK}$.

The zero current detector 60 asserts a zero current detection signal $S_{ZERO}$ when current $I_{M2}$ flowing into the synchronous rectifying transistor M2 decreases to a near-zero threshold value $I_{ZERO}$. In an on period of the synchronous rectifying transistor M2, a voltage $V_{LX}$ of the switching terminal LX is given by $V_{IM2}=-R_{ON2} \times I_{M2}$. Where, $R_{ON2}$ denotes an on resistor of the synchronous rectifying transistor M2. The zero current detector 60 includes a comparator to compare the voltage $V_{LX}$ of the switching terminal LX with a predetermined threshold voltage $V_{ZERO}$.

The driving circuit $20r$ includes a control logic part $22r$ and a pre-driver 24. The control logic part $22r$ receives the on signal $S_{ON}$, the off signal $S_{OFF}$ and the zero current detection signal $S_{ZERO}$ and generates a control signal to direct turning-on/off of the switching transistor M1 and the synchronous rectifying transistor M2. The pre-driver 24 controls the switching transistor M1 and the synchronous rectifying transistor M2 based on the control signal generated by the control logic part $22r$.

When the on signal $S_{ON}$ is asserted, the driving circuit $20r$ turns on the switching transistor M1 and turns off the synchronous rectifying transistor M2 (a first state $\phi 1$). Subsequently, when the off signal $S_{OFF}$ is asserted, the driving circuit $20r$ turns off the switching transistor M1 and turns on the synchronous rectifying transistor M2 (a second state $\phi 2$). Subsequently, when the zero current detection signal $S_{ZERO}$ is asserted, the driving circuit $20r$ turns off both of the switching transistor M1 and the synchronous rectifying transistor M2 (a third state $\phi 3$).

FIGS. 2A and 2B are operation waveform diagrams of the switching regulator $4r$ of FIG. 1. Prior to time t1, the switching regulator $4r$ is in the third state $\phi 3$ and the switching transistor M1 and the synchronous rectifying transistor M2 are in a turned-off state. The output capacitor C1 is discharged by load current and the output voltage $V_{OUT}$ is decreasing. At time t1, when the feedback voltage $V_{FB}$ decreases to the reference voltage $V_{REF}$, the on signal $S_{ON}$ is asserted. Due to this assertion, the switching regulator $4r$ transitions from the third state $\phi 3$ to the first state $\phi 1$ and the switching transistor M1 is turned on.

When the switching transistor M1 is turned on, the voltage $V_{LX}$ of the switching terminal LX rises to the proximity of an input voltage $V_{DD}$. In addition, as coil current $L_{COIL}$ increases, i.e., as the current $L_{M1}$ of the switching transistor M1 increases, a voltage drop of the switching transistor M1 increases and the voltage $V_{LX}$ of the switching terminal LX is lowered.

At time t2, when the voltage drop of the switching transistor M1 reaches the threshold value $V_{PEAK}$, in other words, when the voltage $V_{LX}$ of the switching terminal LX decreases to $V_{DD}-V_{PEAK}$, the off signal generator 50 asserts the off signal $S_{OFF}$. Due to this assertion, the switching regulator $4r$ transitions from the first state $\phi 1$ to the second state $\phi 2$, the switching transistor M1 is turned off and the synchronous rectifying transistor M2 is turned on.

At time t3, when current flowing into the synchronous rectifying transistor M2 decreases to the near-zero threshold value $I_{ZERO}$, the zero current detection signal $S_{ZERO}$ is asserted. Due to this assertion, the switching regulator $4r$ transitions from the second state $\phi 2$ to the third state $\phi 3$, both of the switching transistor M1 and the synchronous rectifying transistor M2 are turned off.

At time t4, when the feedback voltage $V_{FB}$ decreases to the reference voltage $V_{REF}$ again, the on signal SON is asserted and the switching regulator $4r$ returns to the first state $\phi 1$. The switching regulator $4r$ repeats the first to third states $\phi 1$ to $\phi 3$ in a light load state.

The switching regulator $4r$ of FIG. 1 has the following problems. The bottom detection comparator 10 has a response delay $\tau_D$ which has an effect on the output voltage $V_{OUT}$. The effect of the response delay $\tau_D$ on the output voltage $V_{OUT}$ will now be described with reference to FIG. 2B.

In FIG. 2B, a solid line represents an ideal state where a response delay is zero. With the zero response delay, when the feedback voltage $V_{FB}$ decreases to the reference voltage $V_{REF}$, the on signal $S_{ON}$ is immediately asserted and the switching regulator $4r$ transitions to the first state $\phi 1$.

When the switching transistor M1 is turned on in the first state $\phi 1$, the output capacitor C1 is charged by the coil current $L_{COIL}$ flowing into the inductor L1 and the output voltage $V_{OUT}$ (the feedback voltage $V_{FB}$) rises.

In FIG. 2B, an alternating long and short dash line represents a case where a non-zero response delay $\tau_D$ exists. During the response delay $\tau_D$, since the switching transistor M1 is not turned on, the output voltage $V_{OUT}$ continues to decrease. That is, a ripple (drop amount) of the output voltage $V_{OUT}$ increases as the response delay $\tau_D$ gets longer.

Similarly, a response delay of the peak current detection comparator 54 has an effect on a peak current $I_{PEAK}$ of the coil current $I_{COIL}$. When the peak current $I_{PEAK}$ is varied, charges supplied into the output capacitor C1 are varied and the ripple of the output voltage $V_{OUT}$ is also varied.

In order to reduce the ripple of the output voltage $V_{OUT}$ and suppress variation of the ripple, there is a need to increase a response speed of the bottom detection comparator 10 or the peak current detection comparator 54. However, this requires an increase in operation current (bias current) of the bottom detection comparator 10r or the peak current detection comparator 54, which may result in low efficiency of the switching regulator $4r$, particularly in a light load state.

SUMMARY

The present disclosure provides various embodiments of a switching regulator which is capable of reducing a ripple of an output voltage while preventing efficiency from being deteriorated.

According to one embodiment of the present disclosure, there is provided a control circuit for controlling a switching transistor and a synchronous rectifying transistor of a switching regulator. The control circuit includes: a bottom detection comparator configured to assert an on signal when a feedback voltage depending on an output voltage of the switching regulator decreases to a predetermined reference voltage; an off signal generator configured to assert an off signal after the on signal is asserted; a zero current detector configured to assert a zero current detection signal when current flowing into the synchronous rectifying transistor decreases to a predetermined threshold value after the off signal is asserted; a control logic part configured to receive the on signal, the off signal and the zero current detection signal and generate a control signal such that the control circuit (i) transitions to a first state where, when the on signal is asserted, the control logic part turns on the switching transistor and turns off the synchronous rectifying transistor, (ii) transitions to a second state where, when the off signal is asserted, the control logic part turns off the switching transistor and turns on the synchronous rectifying transistor, and (iii) transitions to a third state where, when the zero current detection signal is asserted, the control logic part turns off the switching transistor and the synchronous rectifying transistor; and a pre-driver configured to switch the switching transistor and the synchronous rectifying transistor based on the control signal from the control logic part. In the third state, the control logic part reduces operation current of at least a portion of the control circuit until a next on signal is asserted from lapse of a predetermined standby time after the zero current detection signal is asserted.

A period of the third state may become longer as the load becomes lighter. During the third state, since the operation current of at least a portion of the control circuit is reduced after lapse of the standby time, power consumption can be reduced. On the other hand, when the load becomes heavier, the period of the third state becomes shorter. When the period of the third state becomes shorter than the standby time, since the on signal can be asserted with a short delay of the high speed bottom detection comparator before the operation current is reduced, a ripple of the output voltage can be reduced.

According to another embodiment of the present disclosure, there is provided a control circuit for controlling a switching transistor and a synchronous rectifying transistor of a switching regulator. The control circuit includes: a bottom detection comparator configured to assert an on signal when a feedback voltage depending on an output voltage of the switching regulator decreases to a predetermined reference voltage; an off signal generator configured to assert an off signal after the on signal is asserted; a zero current detector configured to assert a zero current detection signal when current flowing into the synchronous rectifying transistor decreases to a predetermined threshold value after the off signal is asserted; a control logic part configured to receive the on signal, the off signal and the zero current detection signal and generate a control signal such that the control circuit (i) transitions to a first state where, when the on signal is asserted, the control logic part turns on the switching transistor and turns off the synchronous rectifying transistor, (ii) transitions to a second state where, when the off signal is asserted, the control logic part turns off the switching transistor and turns on the synchronous rectifying transistor, and (iii) transitions to a third state where, when the zero current detection signal is asserted, the control logic part turns off the switching transistor and the synchronous rectifying transistor; and a pre-driver configured to switch the switching transistor and the synchronous rectifying transistor based on the control signal from the control logic part. In the third state, the control logic part changes the operation current of at least a portion of the control circuit with a lapse of time after the zero current detection signal is asserted.

A period of the third state may become longer as the load becomes lighter. During the third state, since the operation current of at least a portion of the control circuit is reduced after lapse of the standby time, power consumption can be reduced. On the other hand, when the load becomes heavier, the period of the third state becomes shorter. When the period of the third state becomes shorter than the standby time, since the on signal can be asserted with a short delay of the bottom detection comparator before the operation current is reduced, a ripple of the output voltage can be reduced.

The control logic part may reduce at least the operation current of the bottom detection comparator.

The off signal generator may assert the off signal when current flowing into the switching transistor reaches a predetermined peak value.

The off signal generator may include: a current generator configured to generate a detection voltage depending on a voltage drop of the switching transistor; and a peak current detection comparator configured to compare the detection voltage with a threshold voltage depending on the peak value and generate the off signal based on a result of the comparison. The control logic part may reduce at least an operation current of the peak current detection comparator.

The off signal generator may include a timer circuit configured to assert the off signal after lapse of on-time having a length depending on an input voltage and an output voltage of the switching regulator after the on signal is asserted. The control logic part may reduce at least an operation current of the timer circuit. With this configuration, since the off signal is generated on the basis of time measurement by the timer circuit, rather than a voltage comparison by a comparator, a peak of the coil current can be controlled with high precision.

The timer circuit may adjust the length of the on-time based on a difference between the input voltage and the output voltage. A slope of the current flowing into the switching transistor, i.e., the coil current, is proportional to a voltage across an inductor (coil) of the switching regulator, i.e., a difference between the input voltage and the output voltage. With this configuration, by changing the on-time in response to the slope of the coil current even in a situation where at least one of the input voltage and the output voltage is varied, a peak of the coil current can remain constant.

The timer circuit may make the length of the on-time shorter as a difference between the input voltage and the output voltage becomes larger.

The timer circuit may adjust the length of the on-time to be substantially inversely proportional to a difference between the input voltage and the output voltage.

The timer circuit may include: a capacitor; a charging circuit configured to charge the capacitor with current depending on a difference between the input voltage and the output voltage; and a comparator configured to compare a voltage of the capacitor with a predetermined threshold voltage.

The charging circuit may charge the capacitor with current proportional to the difference between the input voltage and the output voltage.

The charging circuit may include a transconductance amplifier having a first input terminal receiving the input voltage and a second input terminal receiving the output voltage.

The charging circuit may include: a reference current source configured to generate a reference current; a first transistor which is a P channel MOSFET (Metal Oxide Semiconductor Field Effect Transistor) having a drain electrode connected to the reference current source and a source electrode to which the input voltage is applied; a second transistor which is a P channel MOSFET having a source electrode to which the input voltage is applied, a gate electrode connected to a gate electrode of the first transistor, and a drain electrode connected to an output terminal of the charging circuit; a third transistor which is a P channel MOSFET having a source electrode to which the input voltage is applied, and a gate electrode connected to the gate electrode of the first transistor; and a fourth transistor having a source electrode connected to a drain electrode of the third transistor, a gate electrode to which the output voltage is applied, and a drain electrode connected to the output terminal of the charging circuit.

The timer circuit may include: a capacitor; a charging circuit configured to charge the capacitor with a predetermined current; a variable voltage source configured to generate a threshold voltage depending on a difference between the input voltage and the output voltage; and a comparator configured to compare a voltage of the capacitor with the threshold voltage.

The variable voltage source may generate the threshold voltage substantially inversely proportional to the difference between the input voltage and the output voltage.

The switching regulator may be of a step-down type.

The control circuit may be integrated on a single semiconductor substrate. The term "integration" may include a case where all circuit elements are formed on a single semiconductor substrate, a case where some main circuit elements are integrated on a single semiconductor, and a case where some resistors, capacitors and so on are formed out of a semiconductor substrate. When circuits are integrated into a single IC, a circuit area can be reduced and characteristics of circuit elements can be uniformly maintained.

According to another embodiment of the present disclosure, there is provided a switching regulator comprising the above-described control circuit.

According to another embodiment of the present disclosure, there is provided an electronic apparatus comprising the above-described switching regulator.

Other aspects of the present disclosures may include any combinations of the above-described elements or conversion of expression of the present disclosure between methods, apparatuses and so on.

BRIEF DESCRIPTION OF THE DRAWINGS

FIGS. 2A and 2B are operation waveform diagrams of the switching regulator of FIG. 1.

FIGS. 5A and 5B are operation waveform diagrams of the switching regulator of FIG. 3 for smaller load current $I_{OUT}$ and larger load current $I_{OUT}$, respectively.

FIG. 6 is a graphical representation showing relationships between load current and output voltage.

DETAILED DESCRIPTION

Figure 1:
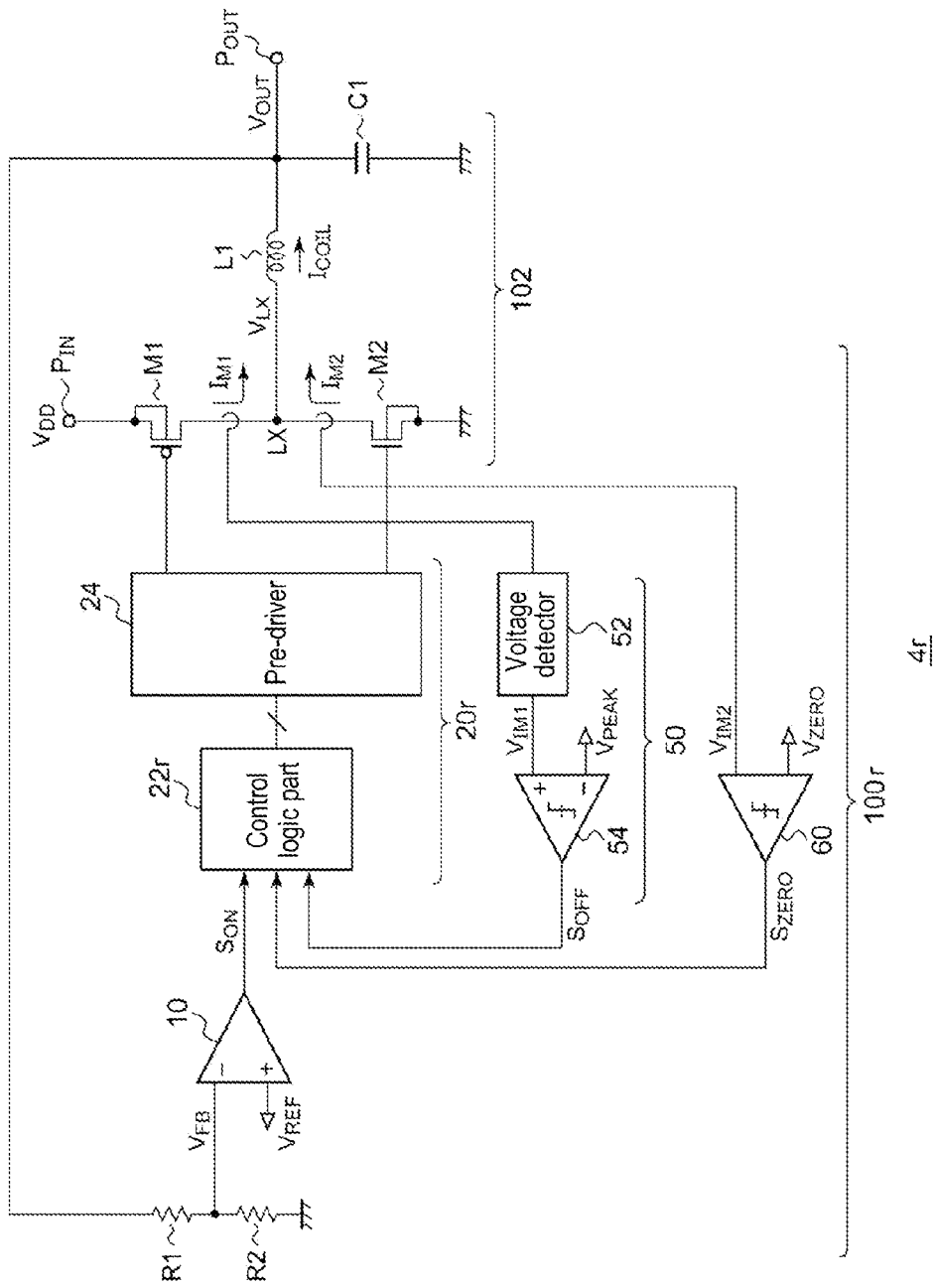
FIG. 1 is a circuit diagram showing a switching regulator.

Various embodiments of the present disclosure will now be described in detail with reference to the drawings. Throughout the drawings, the same or similar elements, members and processes are denoted by the same reference numerals and explanations of which will not be repeated. The disclosed embodiments are provided for the purpose of illustration, not limitation, of the present disclosure.

In the specification, the phrase "connection of a member A and a member B" is intended to include direct physical connection of the member A and the member B as well as indirect connection thereof via other member as long as the other member has no substantial effect on the electrical connection of the member A and the member B or has no damage to functions and effects shown by a combination of the member A and the member B. Similarly, the phrase "interposition of a member C between a member A and a member B" is intended to include direct connection of the member A and the member C or direct connection of the member B and the member C as well as indirect connection thereof via other member as long as the other member has no substantial effect on the electrical connection of the member A, the member B and the member C or has no damage to functions and effects shown by a combination of the member A, the member B and the member C.

(First Embodiment)

Figure 3:
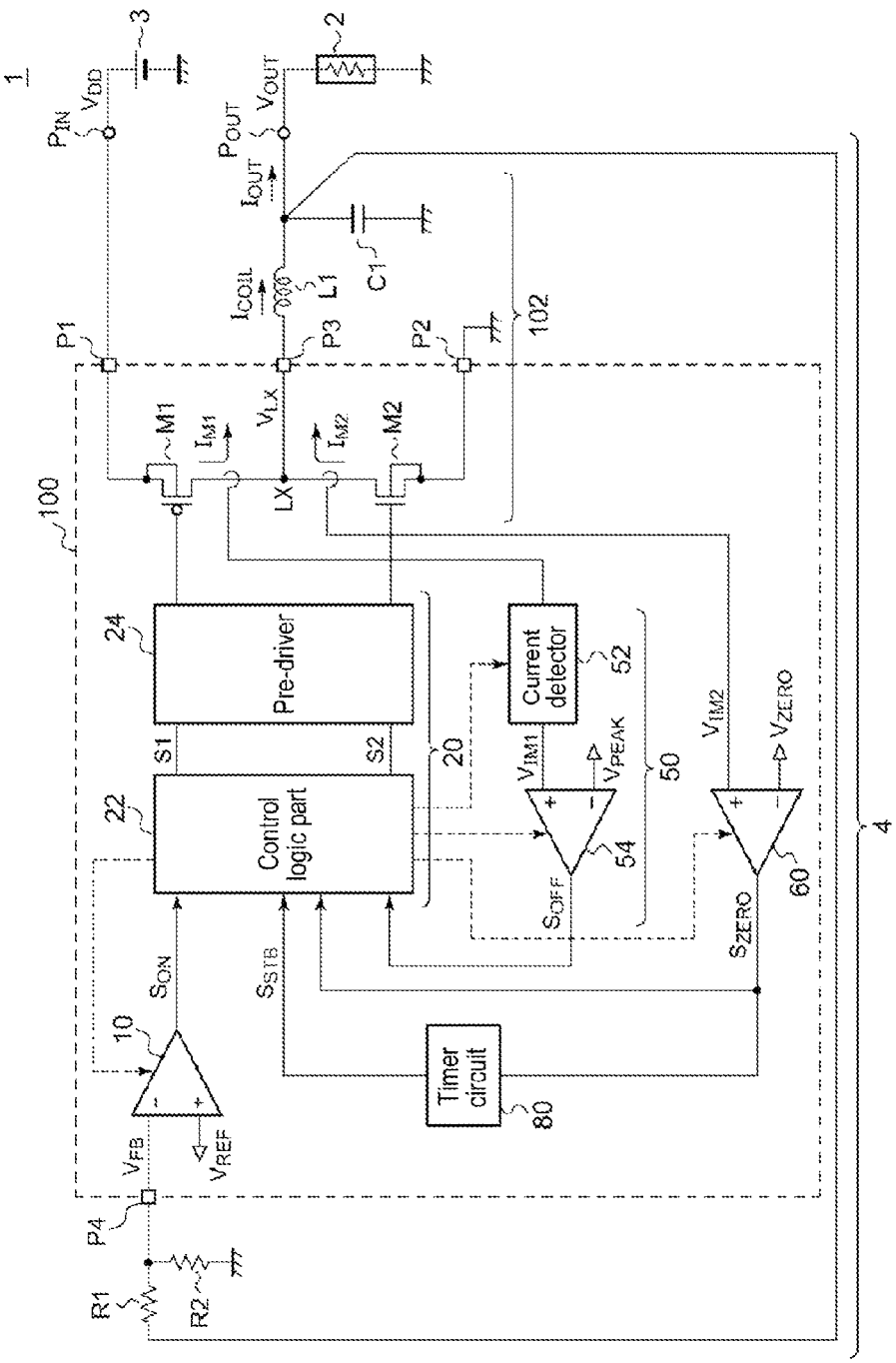
FIG. 3 is a circuit diagram showing a configuration of an electronic apparatus including a switching regulator according to a first embodiment.

FIG. 3 is a circuit diagram showing a configuration of an electronic apparatus 1 including a switching regulator 4 according to a first embodiment.

The electronic apparatus 1 may be a tablet PC (Personal Computer), a laptop PC, a mobile terminal, a digital camera, a digital video camera, a portable audio player, a PDA (Personal Digital Assistant) or the like. The electronic apparatus 1 includes a load 2, a battery 3 and a switching regulator 4.

The load 2 includes various digital circuits, analog circuits and combinations thereof, including a CPU (Central Processing Unit), a DSP (Digital Signal Processor), a GPU (Graphics Processing Unit), a microcontroller, a memory, a liquid crystal driver, an audio circuit, etc.

The switching regulator 4 receives a power source voltage (also referred to as an input voltage) $V_{DD}$ and steps down the power source voltage to generate a stabilized output voltage $V_{OUT}$ which is then supplied to the load 2. The power source $V_{DD}$ is supplied from the battery 3 or an external power supply (not shown).

The switching regulator 4 includes a control circuit 100, an inductor L1, an output capacitor C1, a first voltage-dividing resistor R1 and a second voltage-dividing resistor R2, all of which may be integrated on a single semiconductor substrate.

The control circuit 100 drives a switching transistor M1 and a synchronous rectifying transistor M2 based on a feedback voltage $V_{FB}$ depending on an output signal (the output voltage $V_{OUT}$ in this embodiment) of the switching regulator 4 and stabilizes the output voltage $V_{OUT}$ to a desired level.

Although it is illustrated in this embodiment that the switching transistor M1 and the synchronous rectifying transistor M2 are incorporated in the control circuit 100, these transistors may be discrete devices installed out of the control circuit 100. The switching transistor M1 and the synchronous rectifying transistor M2 may be bipolar transistors.

An output circuit 102 including the switching transistor M1, the synchronous rectifying transistor M2, the inductor L1 and the output capacitor C1 has a topology of a synchronous rectification type switching regulator.

The output capacitor C1 is interposed between an output terminal $P_{OUT}$ and a ground terminal. The inductor L1 is interposed between the output terminal $P_{OUT}$ and a switching terminal P3 of the control circuit 100. The input voltage $V_{DD}$ is input to an input terminal P1 of the control circuit 100 and a ground terminal P2 is grounded. The first voltage-dividing resistor R1 and the second voltage-dividing resistor R2 divide the output voltage $V_{OUT}$ and provide a feedback voltage VFB depending on the output voltage $V_{OUT}$ to a feedback terminal P4 of the control circuit 100.

The control circuit 100 includes a bottom detection comparator 10, a driving circuit 20, an off signal generator 50 and a zero current detector 60 in addition to the switching transistor M1 and the synchronous rectifying transistor M2.

The switching transistor M1 and the synchronous rectifying transistor M2 are connected in series between the input terminal P1 and the ground terminal P1. A junction point LX of the switching transistor M1 and the synchronous rectifying transistor M2 is connected to the switching terminal P3.

The bottom detection comparator 10 compares the feedback voltage $V_{FB}$ with a predetermined reference voltage $V_{REF}$ and generates an on signal $S_{ON}$ asserted (for example, having a high level) when the feedback voltage $V_{FB}$ decreases to the reference voltage $V_{REF}$.

The off signal generator 50 includes a current detector 52 and a peak current detection comparator 54, and generates an off signal $S_{OFF}$ asserted when current $I_{M1}$ flowing into the switching transistor M1 reaches a predetermined peak current $I_{PEAK}$.

The zero current detector 60 asserts a zero current detection signal $S_{ZERO}$ when current IM2 (coil current $I_{COIL}$) flowing into the synchronous rectifying transistor M2 decreases to a near-zero threshold value $I_{ZERO}$ after the synchronous rectifying transistor M2 is turned on with an assertion of the off signal $S_{OFF}$. In an on period of the synchronous rectifying transistor M2, a voltage $V_{LX}$ of the switching terminal LX is given by $V_{IM2} = -R_{ON2} \times I_{M2}$. Where, $R_{ON2}$ denotes an on resistor of the synchronous rectifying transistor M2. The zero current detector 60 may include a comparator to compare the voltage $V_{LX}$ of the switching terminal LX with a predetermined threshold voltage $V_{ZERO}$. In addition, the zero current detector 60 may be configured in different ways without being limited to that shown in FIG. 3. For example, a resistor (not shown) for current detection may be connected in series to the synchronous rectifying transistor M2 and a voltage drop of the resistor may be compared to the threshold voltage $V_{ZERO}$.

In an on period of the switching transistor M1, a voltage $V_{LX}$ of the junction point (the switching terminal) LX of the switching transistor M1 and the synchronous rectifying transistor M2 is given by $V_{DD} - I_{M1} \times R_{ON1}$. Where, $R_{ON1}$ denotes an on resistor of the switching transistor M1. The current detector 52 generates a detection voltage $V_{IM1}$ depending on a voltage drop ($I_{M1} \times R_{ON1}$) of the switching transistor M1.

The peak current detection comparator 54 compares the detection voltage $V_{IM1}$ with a threshold voltage $V_{PEAK}$ corresponding to the peak current $I_{PEAK}$ and asserts the off signal $S_{OFF}$ (for example, having a high level) when the detection voltage $V_{IM1}$ reaches the threshold voltage $V_{PEAK}$, in other words, when the current $I_{M1}$ reaches the predetermined peak current $I_{PEAK}$.

The driving circuit 20 includes a control logic part 22 and a pre-driver 24. The control logic part 22 receives the on signal $S_{ON}$, the off signal $S_{OFF}$ and the zero current detection signal $S_{ZERO}$ and generates control signals S1 and S2 to direct turning-on/off of the switching transistor M1 and the synchronous rectifying transistor M2. The pre-driver 24 switches the switching transistor M1 and the synchronous rectifying transistor M2 based on the control signals S1 and S2.

Specifically, the control logic part 22 (i) transitions to a first state φ1 where, when the on signal $S_{ON}$ is asserted, the control logic part 22 turns on the switching transistor M1 and turns off the synchronous rectifying transistor M2, (ii) transitions to a second state φ2 where, when the off signal $S_{OFF}$ is asserted, the control logic part 22 turns off the switching transistor M1 and turns on the synchronous rectifying transistor M2, and (iii) transitions to a third state φ3 where, when the zero current detection signal $S_{ZERO}$ is asserted, the control logic part 22 turns off the switching transistor M1 and the synchronous rectifying transistor M2. The driving circuit 20 repeats the first to third states φ1 to φ3 and stabilizes the output voltage $V_{OUT}$ to a target value depending on the reference voltage $V_{REF}$.

In addition, in the third state φ3, the control logic part 22 reduces the operating current of at least a portion of the control circuit 100 until a next on signal $S_{ON}$ is asserted from the lapse of a predetermined standby time τw after the zero current detection signal $S_{ZERO}$ is asserted. A timer circuit 80 generates a standby signal $S_{STB}$ asserted with the lapse of the standby time τw after the zero current detection signal $S_{ZERO}$ is asserted. When the standby signal $S_{STB}$ is asserted during the third state φ3, the control logic part 22 reduces current consumption of at least a portion of the control circuit 100 in a standby state φ4 (until the next on signal $S_{ON}$ is asserted). The configuration of the timer circuit 80 is not particularly limited but it may be an analog or digital timer.

For example, the control logic part 22 may reduce operating current of the bottom detection comparator 10, the current detector 52, the peak current detection comparator 54 and the zero current detector 60 during the standby state φ4.

An example of control of operating current will now be described.

The operating current (bias current) of the bottom detection comparator 10 can be switched between two phases. If the bias current of the bottom detection comparator 10 is larger, the bottom detection comparator 10 is operated at a high speed state and its delay $\tau_D$ has a relatively small first value $\tau_{D1}$. If the bias current is smaller, the bottom detection comparator 10 is operated at a low speed state and its delay m has a second value $\tau_{D2}$ larger than the first value $\tau_{D2}$. The control logic part 22 reduces the bias current of the bottom detection comparator 10 in the standby state φ4.

In addition, like the bottom detection comparator 10, the operating current of the off signal generator 50 and the zero current detector 60 can be also switched between two phases. The operating current of the off signal generator 50 and the zero current detector 60 may be substantially zero in the standby state φ4.

Subsequently, an operation of the switching regulator 4 will be described. Advantages of the switching regulator 4 can become more apparent by a comparison with a comparative technique. Thus, the comparative technique will be described below prior to a description on the operation of the switching regulator 4.

In the comparative technique, a normal operating current is supplied to the bottom detection comparator 10, the off signal generator 50 and the zero current detector 60 in the first and second states φ1 and φ2. In the third state φ3, their operating current is reduced. That is, the response delay $\tau_D$ of the bottom detection comparator 10 has the first value $\tau_{D1}$ in the first and second states φ1 and φ2 and the second value $\tau_{D2}$ in the third state φ3.

Figure 4A:
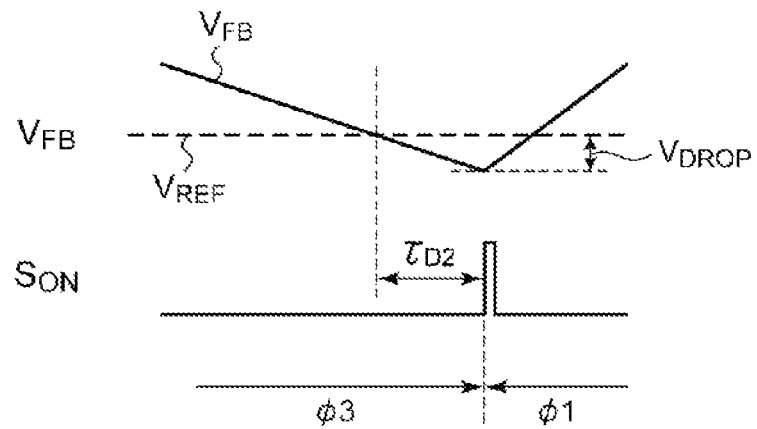
FIGS. 4A and 4B are operation waveform diagrams of a switching regulator according to a comparative technique under a light load state and a heavy load state, respectively.
Figure 4B:
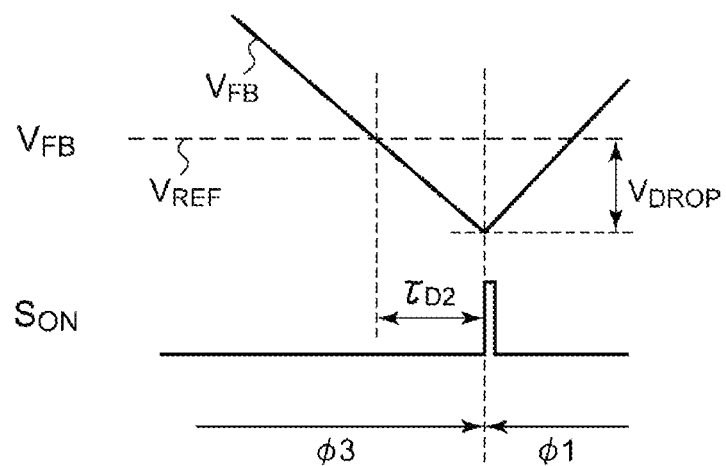

This comparative technique has the following problem. FIGS. 4A and 4B are operation waveform diagrams of a switching regulator according to the comparative technique in a light load state and a heavy load state, respectively. In the third state φ3, when the operating current of the bottom detection comparator 10 is reduced, the response delay $\tau_D$ of the bottom detection comparator 10 has the larger second value $\tau_{D2}$.

In the third state φ3 where switching of the switching transistor M1 and the synchronous rectifying transistor M2 is stopped, as charges of the output capacitor C1 are discharged by load current $I_{OUT}$, the feedback voltage $V_{FB}$ (the output voltage $V_{OUT}$) gets lowered with a slope depending on the load current $I_{OUT}$. Since the feedback voltage $V_{FB}$ continues to be lowered during the response delay $\tau_{D2}$ of the bottom detection comparator 10, the feedback voltage $V_{FB}$ gets lower than the target level $V_{REF}$.

FIG. 6 is a graphical representation showing relationships between a load current and output voltage. In FIG. 6, a solid line represents a relationship between the load current and the output voltage $V_{OUT}$ (average level) of the switching regulator 4 of FIG. 3, and an alternating long and short dash line represents a relationship between the load current $I_{OUT}$ and the output voltage $V_{OUT}$ in the comparative technique. In the comparative technique, when the feedback voltage $V_{FB}$ is compared to the reference voltage $V_{REF}$, the response delay $\tau_D$ of the bottom detection comparator 10 is maintained at a predetermined value at all times. Since the feedback voltage $V_{FB}$ is monotonously lowered with decrease in the load current $I_{OUT}$, a heavier load provides an increased voltage difference (voltage drop amount) $V_{DROP}$ between the feedback voltage $V_{FB}$ and the target level $V_{REF}$. That is, a heavier load provides a decreased average level of the output voltage $V_{OUT}$, which results in poor load regulation.

The operation of the switching regulator 4 under a light load state and a heavy load state will be now described. FIGS. 5A and 5B are operation waveform diagrams of the switching regulator 4 of FIG. 3 for smaller load current $I_{OUT}$ and larger load current $I_{OUT}$, respectively.

(Light Load State)

Figure 2B:
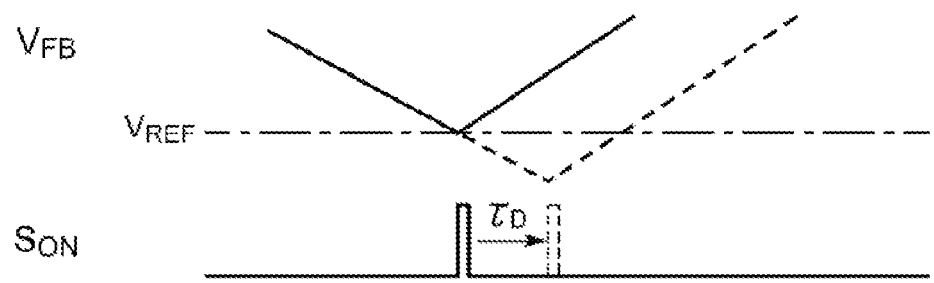

An operation in a light load state will be now described with reference to FIG. 5A. The basic operation of the switching regulator 4 has been described with reference to FIGS. 2A and 2B. In the first and second states φ1 and φ2, the control logic part 22 sets the operation current of the bottom detection comparator 10, the off signal generator 50 and the zero current detector 60 to be a predetermined value. In this condition, the off signal generator 50 and the zero current detector 60 can be operated at a high speed with a small delay.

After transitioning to the third state φ3, the control logic part 22 transitions to the standby state φ4 after lapse of the standby time τw where the operation current of the off signal generator 50 and the zero current detector 60 is reduced. Since the off signal generator 50 and the zero current detector 60 are used in the third state φ3, power consumption of the control circuit 100 may be reduced by setting their operation current to zero.

In addition, the operation current of the bottom detection comparator 10 is reduced in the standby state φ4, which can result in reduction of power consumption of the control circuit 100.

On the other hand, although the response delay $\tau_D$ of the bottom detection comparator 10 has a larger second value $\tau_{D2}$ when the operation current of the bottom detection comparator 10 is reduced, since a speed of decrease of the feedback voltage $V_{FB}$ is low, a drop amount $V_{DROP}$ from the reference voltage VREF is not so increased.

(Heavy Load State)

As the load gets heavier, the length of the third state φ3 gets shorter and accordingly the length of the standby state φ4 also gets shorter. If the load current $I_{OUT}$ exceeds a threshold value, the feedback voltage $V_{FB}$ decreases to the reference voltage $V_{REF}$ before transitioning to the standby state φ4, as shown in FIG. 5B. At this time, since the response delay $\tau_D$ of the bottom detection comparator 10 has a smaller first value $\tau_{D1}$, the drop amount $V_{DROP}$ can be reduced despite the fact that a speed of decrease of the feedback voltage $V_{FB}$ is high.

In FIG. 6, a solid line represents a relationship between the load current and the output voltage $V_{OUT}$ (average level) of the switching regulator 4 of FIG. 3.

When $I_{OUT}=I_{TH}$, the standby time τw becomes equal to the third state φ3. In the light load state of $I_{OUT}<I_{TH}$, the standby state φ4 exists and the response speed of the bottom detection comparator 10 is low within a range where the load current $I_{OUT}$ is smaller than a threshold value $I_{TH}$. A characteristic in the light load state is equal to that in the comparative technique.

If the load current $I_{OUT}$ becomes larger than the threshold value $I_{TH}$, the length of the third state φ3 becomes shorter than the standby time τw. At this time, the switching regulator 4 does not transition to the standby state φ4 and the on signal $S_{ON}$ is generated by the high speed bottom detection comparator 10. Accordingly, the drop amount $V_{DROP}$ becomes small.

According to the switching regulator 4, the period of the third state φ3 becomes longer as the load becomes lighter. During the third state φ3, since the switching regulator 4 enters the standby state φ4 after lapse of the standby time τw and the operation current of at least a portion of the control circuit 100 is reduced, power consumption can be reduced.

In addition, when the load becomes heavier, the period of the third state φ3 becomes shorter. When the period of the third state φ3 becomes shorter than the standby time, since the on signal is asserted before the operation current is reduced, in other words, with a high response speed of the bottom detection comparator 10, the drop amount (ripple) $V_{DROP}$ of the output voltage $V_{OUT}$ can be reduced.

In addition, the threshold value $I_{TH}$ depends on the standby time τw, inductance of the inductor L1 and capacitance of the output capacitor C1. In other words, the threshold value $I_{TH}$ can be arbitrarily set depending on the standby time τw.

(Second Embodiment)

Figure 7:
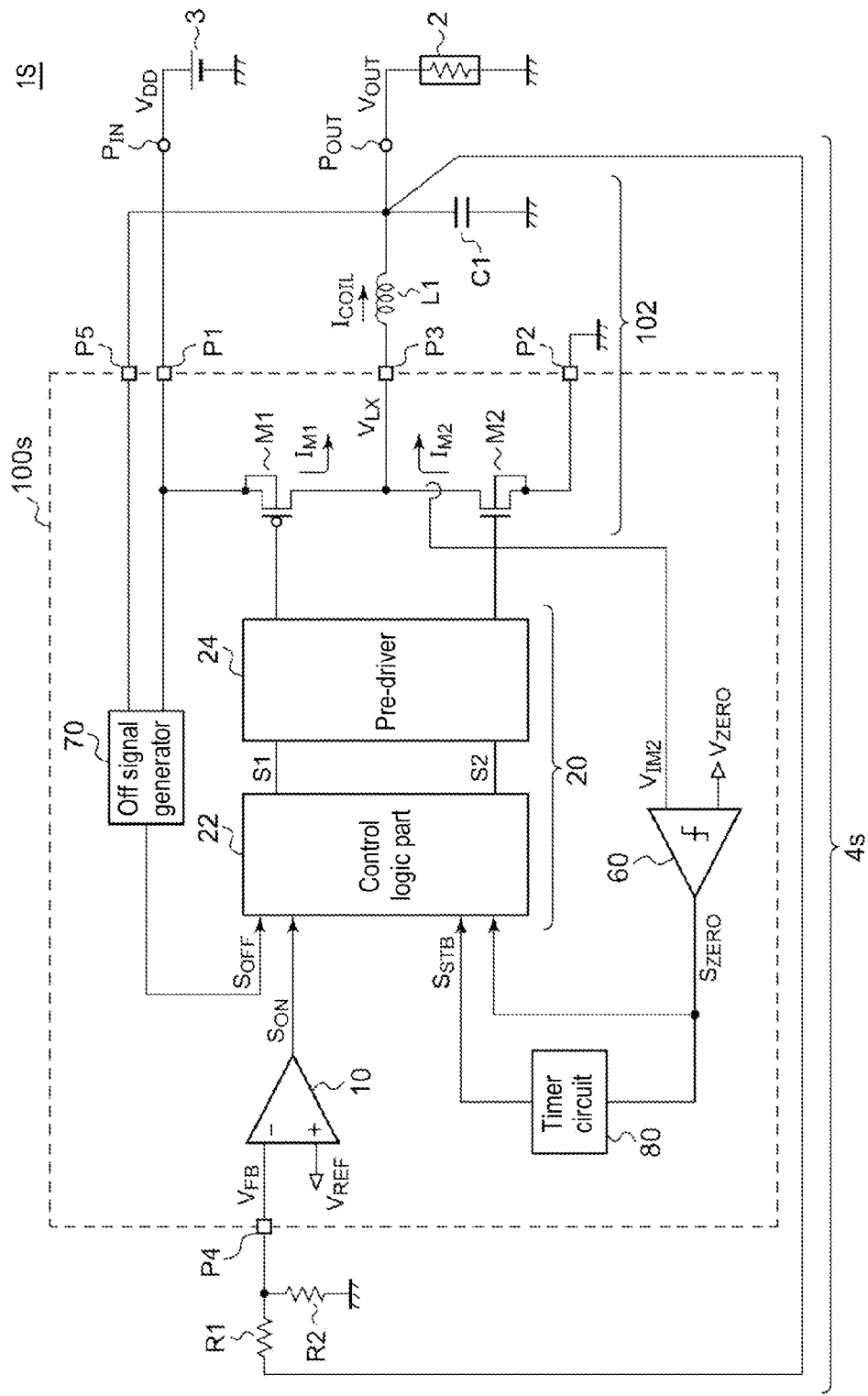
FIG. 7 is a circuit diagram showing a configuration of a switching regulator according to a second embodiment.

FIG. 7 is a circuit diagram showing a configuration of an electronic apparatus 1s including a switching regulator 4s according to a second embodiment. The switching regulator 4s includes an off signal generator 70 instead of the off signal generator 50 of the switching regulator 4 of FIG. 3. In addition, an output voltage $V_{OUT}$ of the switching regulator 4s is input to an output voltage detection terminal P5. Other configurations are the same as those in the switching regulator 4 of FIG. 3.

The off signal generator 70 shown in FIG. 7 includes a timer circuit 80. The off signal generator 70 measures on-time $T_{ON}$ after an on signal $S_{ON}$ is asserted, i.e., after the switching transistor M1 is turned on, and generates an off signal $S_{OFF}$ asserted after lapse of the on-time $T_{ON}$. The off signal generator 70 sets the length of the on-time $T_{ON}$ based on the input voltage $V_{DD}$ and the output voltage $V_{OUT}$ of the switching regulator 4s.

In the electronic apparatus 1s, one or both of the input voltage $V_{DD}$ and the output voltage $V_{OUT}$ may be varied. For example, when the input voltage $V_{DD}$ is supplied from the battery 3, the input voltage $V_{DD}$ decreases as the battery 3 is discharged, whereas the input voltage $V_{DD}$ increases as the battery 3 is charged. In case of using a lithium ion battery as the battery 3, for example, the input voltage $V_{DD}$ may be varied within a range of 3.2V to 4.2V.

It is also assumed that the output voltage $V_{OUT}$ supplied to the load 2 may be dynamically varied.

A slope of the coil current $I_{COIL}$ is proportional to a voltage across the inductor L1. During an on-period of the switching transistor M1 and an off-period of the synchronous rectifying transistor M2, the input voltage $V_{DD}$ is applied to one end of the inductor L1 and the output voltage $V_{OUT}$ is applied to the other end. That is, the voltage across the inductor L1 becomes $V_{DD}-V_{OUT}$.

In a first state, the coil current $I_{COIL}$ increases with a slope $((V_{DD}-V_{OUT})/L)$. The coil current $I_{COIL}$ has a peak after lapse of the on-time $T_{ON}$ and the peak current $I_{PEAK}$ is given by the following equation 1.

$$I_{PEAK}=(V_{DD}-V_{OUT})/L \times T_{ON} \quad \text{[Equation 1]}$$

When at least one of the input voltage $V_{DD}$ and the output voltage $V_{OUT}$ is varied, the peak current $I_{PEAK}$ can remain constant by adjusting the on-time $T_{ON}$ to cancel such variation. That is, the on-time $T_{ON}$ is adjusted to satisfy the following equation 2.

$$T_{ON}=I_{PEAK}/(V_{DD}-V_{OUT}) \times L \quad \text{[Equation 2]}$$

From a different standpoint, the off signal generator 70 of FIG. 7 adjusts the length of the on-time $T_{ON}$ based on a difference ($V_{DD}-V_{OUT}$) between the input voltage $V_{DD}$ and the output voltage $V_{OUT}$. The off signal generator 70 may make the length of the on-time $T_{ON}$ shorter as the difference ($V_{DD}-V_{OUT}$) between the input voltage $V_{DD}$ and the output voltage $V_{OUT}$ becomes larger. In other words, the off signal generator 70 may adjust the length of the on-time $T_{ON}$ to be substantially inversely proportional to the difference ($V_{DD}-V_{OUT}$) between the input voltage $V_{DD}$ and the output voltage $V_{OUT}$.

FIGS. 8A to 8D are circuit diagrams illustrating example configurations of the off signal generator 70. An off signal generator 70a of FIG. 8A includes a capacitor C11, a switch SW11, a current source 72 and a comparator 74. The capacitor C11 has one end having a fixed potential and the other end to which the current source 72 is connected. The current source 72 charges the capacitor C11 with charging current $I_{CHG}$ depending on the input voltage $V_{DD}$ and the output voltage $V_{OUT}$. The switch SW11 is provided to initialize a voltage $V_{C11}$ of the capacitor C11 to zero and is switched off as the on-time $T_{ON}$ is started. The comparator 74 compares the voltage $V_{C11}$ of the capacitor C11 with a predetermined threshold voltage $V_{TH}$ and generates an off signal $S_{OFF}$ asserted (for example, having a high level) when the voltage $V_{C11}$ reaches the threshold voltage $V_{TH}$.

The on-time $T_{ON}$ measured from when the switch SW11 is switched off until when the off signal $S_{OFF}$ is asserted is given by the following equation 3.

$$T_{ON}=C11 \times V_{TH}/I_{CHG} \quad \text{[Equation 3]}$$

The current source 72 may generate the charging current $I_{CHG}$ to be substantially proportional to the difference voltage ($V_{DD}-V_{OUT}$). Using a proportional coefficient $g_m$, the following equation 4 is established.

$$I_{CHG}=g_m \times (V_{DD}-V_{OUT}) \quad \text{[Equation 4]}$$

The following equation 5 can be obtained by putting Equation 4 into Equation 3.

$$T_{ON}=C11 \times V_{TH}/\{g_m \times (V_{DD}-V_{OUT})\} \quad \text{[Equation 5]}$$

In comparison between Equation 2 and Equation 5, the peak of the coil current $I_{COIL}$ can be set to a desired value $I_{PEAK}$ by adjusting the capacitance of the capacitor C11, the threshold value $V_{TH}$ and the proportional coefficient $g_m$, as can be seen from the following equation 6.

$$I_{PEAK}/L=C11 \times V_{TH}/g_m \quad \text{[Equation 6]}$$

Figure 8A:
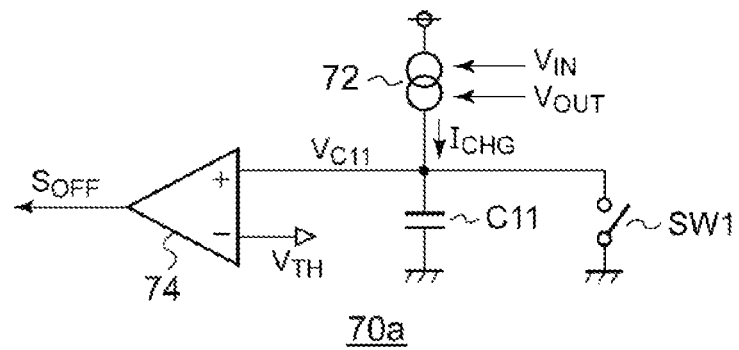
FIGS. 8A to 8D are circuit diagrams for illustrating an example configuration of an off signal generator.
Figure 8B:
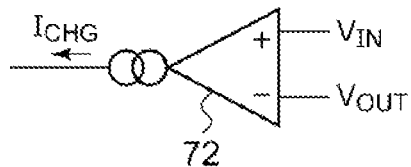

FIG. 8B is a circuit diagram showing an example configuration of the current source 72 of FIG. 8A. The current source 72 includes a transconductance (gm) amplifier and outputs the current $I_{CHG}$ depending on the voltage difference ($V_{DD}-V_{OUT}$), more specifically, outputs the current $I_{CHG}$ substantially proportional to the voltage difference ($V_{DD}-V_{OUT}$). A proportional coefficient corresponds to mutual conductance $g_m$ of the transconductance amplifier.

Figure 8C:
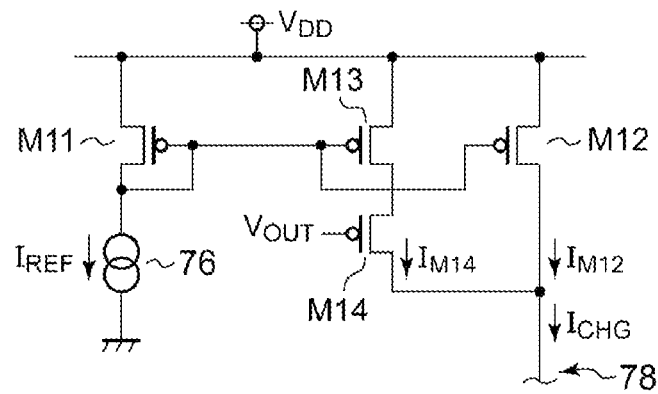

FIG. 8C is a circuit diagram showing another example configuration of the current source 72 of FIG. 8A. The current source 72 includes first to fourth transistors M11 to M14, which are P channel MOSFETs, and a reference current source 76. The reference current source 76 generates a predetermined reference current $I_{REF}$. The first to third transistors M11 to M13 form a current mirror circuit and have their respective source electrodes to which the input voltage $V_{DD}$ is applied. The fourth transistor M14 is interposed between the third transistor M13 and an output terminal 78 of the current source 72 and has its gate electrode to which the output voltage $V_{OUT}$ is applied.

Current $I_{M14}$ flowing into the fourth transistor M14 becomes larger as a difference between $V_{DD}$ and $V_{OUT}$ becomes larger. The current $I_{M14}$ is added to current $I_{M12}$ flowing into the second transistor $M_{12}$ to generate the charging current $I_{CHG}$. Although the charging current $I_{CHG}$ is not completely proportional to the voltage difference between $V_{DD}$ and $V_{OUT}$, the charging current $I_{CHG}$ can be used for the off signal generator 70a since this current depends on the voltage difference between $V_{DD}$ and $V_{OUT}$.

Figure 8D:
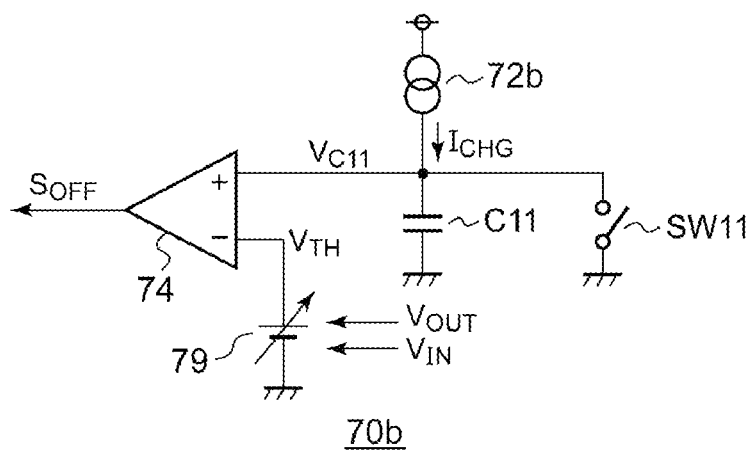

FIG. 8D shows another configuration of the off signal generator. An off signal generator 70b has the same basic configuration as the off signal generator 70a of FIG. 8A. However, a current source 72b generates the predetermined charging current $I_{CHG}$ in a different way as described below. A variable voltage source 79 generates a threshold voltage $V_{TH}$ based on the difference between the input voltage $V_{DD}$ and the output voltage $V_{OUT}$.

The on-time $T_{ON}$ measured from when the switch SW11 is switched off until when the off signal $S_{OFF}$ is asserted is given by the above equation 3.

The variable voltage source 79 may generate a threshold voltage $V_{TH}$ decreasing with an increase in the difference voltage ($V_{DD}$-$V_{OUT}$). In other words, the threshold voltage $V_{TH}$ may be substantially inversely proportional to the difference voltage ($V_{DD}$-$V_{OUT}$). Using an inverse-proportional coefficient $k_m$, the following equation 7 is established.

$$V_{TH}=k_m/(V_{DD}-V_{OUT}) \quad \text{[Equation 7]}$$

The following equation 8 can be obtained by putting Equation 7 into Equation 3.

$$T_{ON}=C11 \times k_m/(V_{DD}-V_{OUT})/I_{CHG} \quad \text{[Equation 8]}$$

In comparison between Equation 2 and Equation 8, the peak of the coil current $I_{COIL}$ can be set to a desired value $I_{PEAK}$ by adjusting the capacitance of the capacitor C11, the charging current $I_{CHG}$ and the coefficient $k_m$, as can be seen from the following equation 9.

$$I_{PEAK}/L=C11 \times k_m/I_{CHG} \quad \text{[Equation 9]}$$

The configuration of the variable voltage source 79 is not particularly limited but may employ circuits known or to be developed in future.

Figure 9:
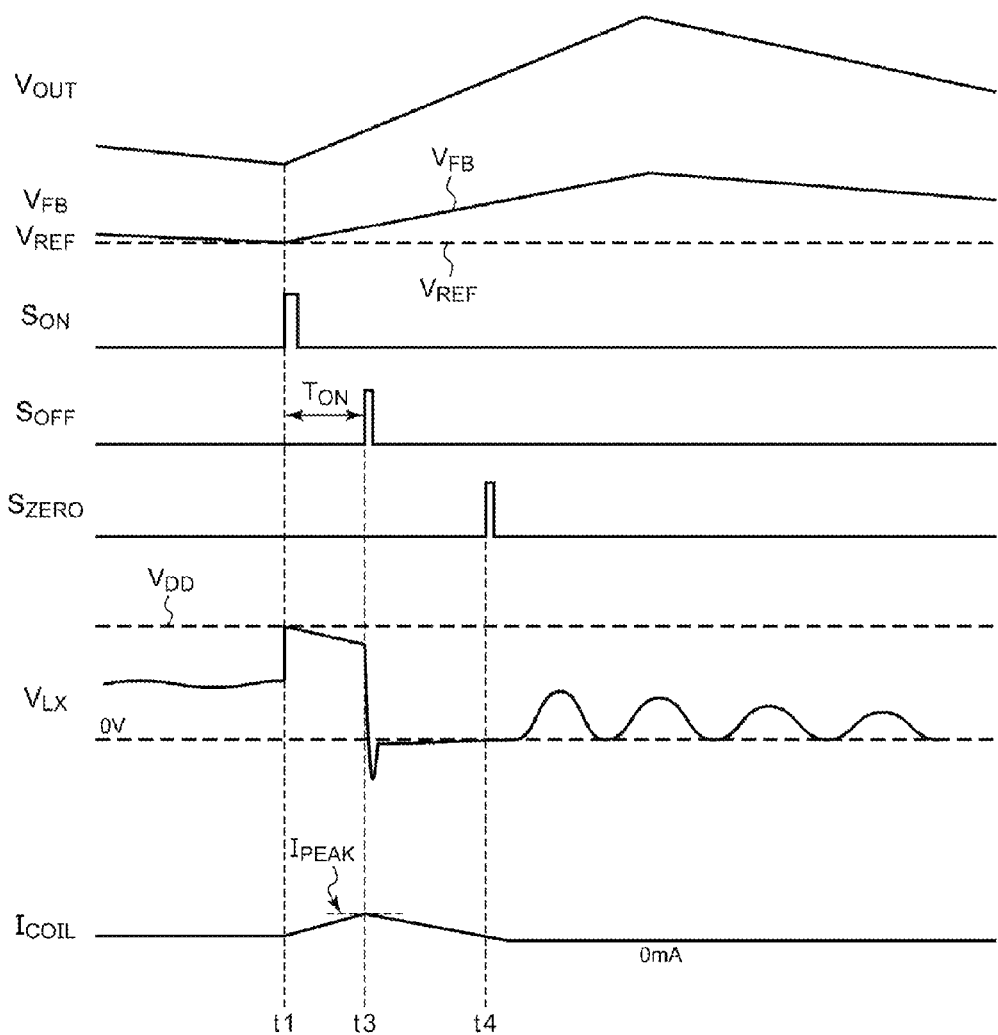
FIG. 9 is an operation waveform diagram of the switching regulator of FIG. 7.

Subsequently, an operation of the switching regulator 4s will be described. FIG. 9 is an operation waveform diagram of the switching regulator 4s of FIG. 7. At time t1, when the feedback voltage $V_{FB}$ decreases to the reference voltage $V_{REF}$, the on signal $S_{ON}$ is asserted. Due to this assertion, the switching regulator 4s transitions to the first state φ1, the switching transistor M1 is turned on and the synchronous rectifying transistor M2 is turned off.

When the switching regulator 4s transitions to the first state φ1, the on-time $T_{ON}$ is measured by the off signal generator 70 and the off signal $S_{OFF}$ is asserted at time t3 after lapse of the on-time $T_{ON}$. Due to this assertion, the switching regulator 4s transitions to the second state φ2, the switching transistor M1 is turned off and the synchronous rectifying transistor M2 is turned on.

At time t4, the zero current detection signal $S_{ZERO}$ is asserted when coil current $I_{COIL}$ ($I_{M2}$) flowing into the synchronous rectifying transistor M2 decreases to a near-zero threshold value $I_{ZERO}$. Due to this assertion, the switching regulator 4s transitions to the third state φ3, both of the switching transistor M1 and the synchronous rectifying transistor M2 are turned off.

The switching regulator 4s further has the following advantages in addition to the advantages of the switching regulator 4 of FIG. 3.

In the switching regulator 4 of FIG. 3, the actual peak $I_{PEAK}$ of the coil current $I_{COIL}$ is affected by the delay $T_D$ of the off signal generator 50 generating the off signal $S_{OFF}$. That is, the input voltage $V_{DD}$ and the output voltage $V_{OUT}$ are varied and a slope of the coil current $I_{COIL}$, for the delay time $\tau_D$ is changed depending on the input voltage $V_{DD}$ and the output voltage $V_{OUT}$. Accordingly, an amount of increase of the coil current $I_{COIL}$ in the delay time $\tau_D$ and further the actual peak current $I_{PEAK}$ are also varied depending on the input voltage $V_{DD}$ and the output voltage $V_{OUT}$. When the peak current $I_{PEAK}$ is varied, a ripple width of the output voltage $V_{OUT}$ is also varied to reduce stabilization of the output voltage $V_{OUT}$.

In contrast, according to the switching regulator 4s of FIG. 7, since the off signal generator 70 generates the off signal $S_{OFF}$ by measuring the on-time $T_{ON}$, it is possible to exclude an effect by a delay as in the off signal generator 50. In addition, although the peak current is also changed by an offset of the peak current detection comparator 54 in the off signal generator 50, such an affect by the offset can be excluded in the switching regulator 4s of FIG. 7.

In addition, by adjusting the on-time $T_{ON}$ based on the input voltage $V_{DD}$ and the output voltage $V_{OUT}$, the peak current $I_{PEAK}$, i.e., a current ripple, can remain constant and a ripple amount of the output voltage $V_{OUT}$ can also remain constant Subsequently, modifications of the switching regulator 4s of FIG. 7 will be described.

(First Modification)

There is no need for the on-time $T_{ON}$ to be completely inversely proportional to the difference between the input voltage $V_{DD}$ and the output voltage $V_{OUT}$. Even in a deviation from such an inverse proportion relationship, by making the on-time $T_{ON}$ shorter as the difference between the input voltage $V_{DD}$ and the output voltage $V_{OUT}$ becomes larger, variation of the peak current $I_{PEAK}$ can be more effectively suppressed in comparison to fixed on-time $T_{ON}$.

(Second Modification)

Although it has been illustrated in the above embodiments that the on-time $T_{ON}$ is changed depending on the input voltage $V_{DD}$ and the output voltage $V_{OUT}$, the on-time $T_{ON}$ may be fixed if variation of the difference between the input voltage $V_{DD}$ and the output voltage $V_{OUT}$ is small. Even in this case, the peak current can be correctly controlled since it is not affected by the delay time of the off signal generator 50, as opposed to the switching regulator 4 of FIG. 3.

Heretofore, the present disclosure has been described by way of specific embodiments. The disclosed embodiments are merely examples and it is to be understood by those skilled in the art that combinations of elements and processes of the embodiments can be modified in various ways and such modification falls within the scope of the present disclosure. The following description is given to such modification.

(Third Modification)

Although it has been illustrated in the above-described embodiments that the operation current of the control circuit 100 is switched between two phases, the present disclosure is not limited thereto. In a third modification, the control logic part 22 may switch the operation current of at least a portion of the control circuit 100 between multi phases or continuously in the third state φ3 with lapse of time after the zero current detection signal $S_{ZERO}$ is asserted.

In the third modification, the control circuit 100 may be configured such that the operation current $I_{DD}$ of at least a portion of the control circuit 100 is switched between N (≥3)

phases, and a plurality of standby times $\tau w_1, \tau w_2, \ldots \tau w_{N-1}$ may be measured by the timer circuit 80.

$$\tau w_1 < \tau w_2 < \ldots < \tau w_{N-1}$$

$$I_{DD1} > I_{DD2} > \ldots > I_{DDN}$$

Then, before lapse of the standby time $\tau w_1$ after the zero current detection signal $S_{OFF}$ is asserted, the operation current $I_{DD}$ is set to a first value $I_{DD1}$ and the bottom detection comparator 10 is operated at a high speed. Before lapse of the standby time $\tau w_2$ after the lapse of the standby time $\tau w_1$, the operation current $I_{DD}$ is set to a second value $I_{DD2}$. Then, after lapse of the standby time $\tau w_{N-1}$, the operation current $I_{DD}$ is set to an N-th value $I_{DDN}$.

Figure 10:
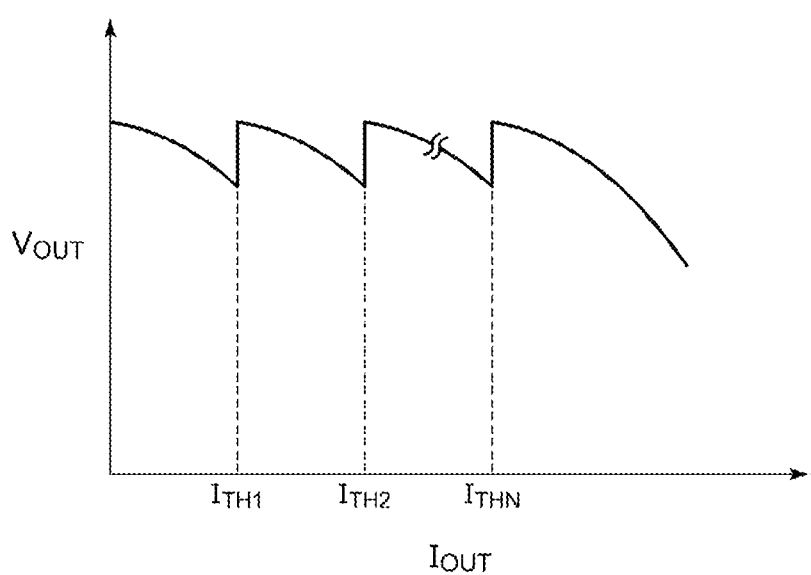
FIG. 10 is a graphical representation showing a relationship between load current and output voltage (average level) of a switching regulator according to a third modification.

FIG. 10 is a graphical representation showing a relationship between a load current and an output voltage (average level) of a switching regulator according to the third modification. Threshold values $I_{TH11H}$ to $I_{THN}$ are determined based on the standby times $\tau w_1$ to $\tau w_{N-1}$. By switching the operation current $I_{DD}$ between multi-phases, it is possible to further improve stabilization of the output voltage $V_{OUT}$.

(Fourth Embodiment)

Although a step-down type switching regulator has been illustrated in the above-described embodiments, the present disclosure is not limited thereto but may be applied to a step-up type or step-up/step-down type switching regulator. In such a step-up type or step-up/step-down type switching regulator, a topology of the output circuit 102 need to be changed.

Figure 11A:
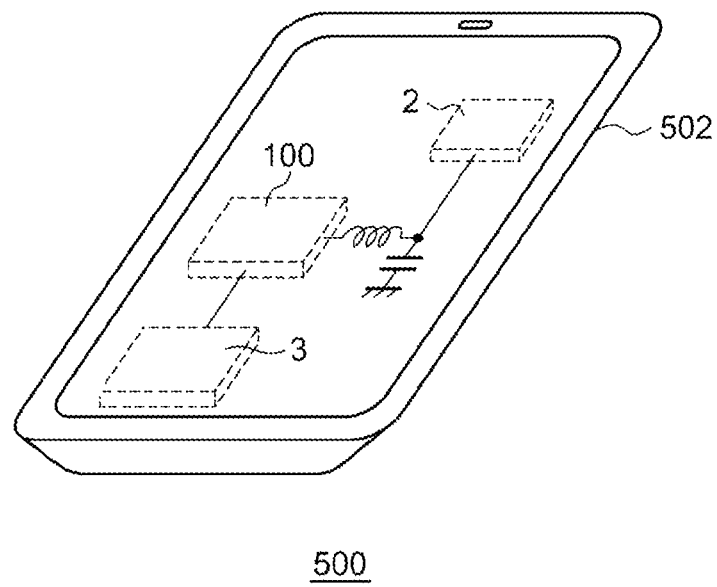
FIGS. 11A and 11B are schematic views showing an electronic apparatus equipped with the switching regulator.
Figure 11B:
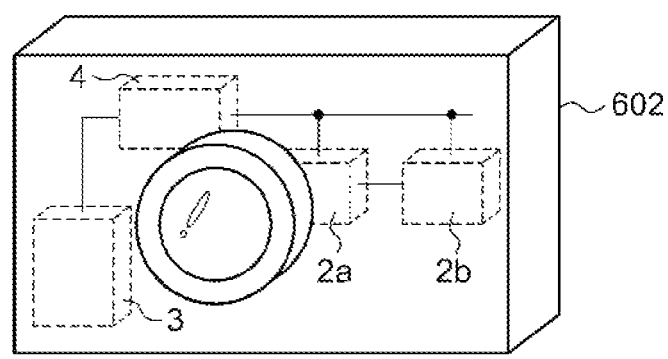

Finally, an example of the electronic apparatus 1 will be described. FIGS. 11A and 11B are schematic views showing an electronic apparatus equipped with the switching regulator 4. An electronic apparatus 500 of FIG. 11A may be a tablet PC, a portable game machine or a portable audio player and has a housing 502 in which the battery 3, the switching regulator 4 (the control circuit 100) and the load 2 are incorporated. The load 2 is, for example, a CPU.

An electronic apparatus 600 of FIG. 11B is a digital camera and has a housing 602 in which the battery 3, the switching regulator 4, an imaging device 2a, an image processor 2b and so on are incorporated. The switching regulator 4 supplies a power source voltage to the imaging device 2a and the image processor 2b.

According to the present disclosure, in some embodiments, it is possible to provide a switching regulator which is capable of reducing a ripple of an output voltage while preventing efficiency from being deteriorated.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit for controlling a switching transistor and a synchronous rectifying transistor of a switching regulator, comprising:
    a bottom detection comparator configured to assert an on signal when a feedback voltage depending on an output voltage of the switching regulator decreases to a predetermined reference voltage;
    an off signal generator configured to assert an off signal when current flowing into the switching transistor reaches a predetermined peak value;
    a zero current detector configured to assert a zero current detection signal when current flowing into the synchronous rectifying transistor decreases to a predetermined threshold value after the off signal is asserted;
    a control logic part configured to receive the on signal, the off signal and the zero current detection signal and generate a control signal such that the control circuit (i) transitions to a first state where, when the on signal is asserted, the control logic part turns on the switching transistor and turns off the synchronous rectifying transistor, (ii) transitions to a second state where, when the off signal is asserted, the control logic part turns off the switching transistor and turns on the synchronous rectifying transistor, and (iii) transitions to a third state where, when the zero current detection signal is asserted, the control logic part turns off the switching transistor and the synchronous rectifying transistor; and
    a pre-driver configured to switch the switching transistor and the synchronous rectifying transistor based on the control signal from the control logic part,
    wherein, in the third state, the control logic part reduces an operation current of at least a portion of the control circuit until a next on signal is asserted from lapse of a predetermined standby time after the zero current detection signal is asserted.

2. The control circuit of claim 1, wherein the control logic part reduces at least operation current of the bottom detection comparator.

3. The control circuit of claim 1, wherein the off signal generator includes:
    a current generator configured to generate a detection voltage depending on a voltage drop of the switching transistor; and
    a peak current detection comparator configured to compare the detection voltage with a threshold voltage depending on the peak value and generate the off signal based on a result of the comparison.

4. The control circuit of any one of claim 1, wherein the off signal generator includes a timer circuit configured to assert the off signal after lapse of on-time having a length depending on an input voltage and an output voltage of the switching regulator after the on signal is asserted.

5. The control circuit of claim 4, wherein the timer circuit adjusts the length of the on-time based on a difference between the input voltage and the output voltage.

6. The control circuit of claim 4, wherein the timer circuit makes the length of the on-time shorter as a difference between the input voltage and the output voltage becomes larger.

7. The control circuit of claim 4, wherein the timer circuit adjusts the length of the on-time to be substantially inversely proportional to a difference between the input voltage and the output voltage.

8. The control circuit of claim 4, wherein the timer circuit includes:
    a capacitor;
    a charging circuit configured to charge the capacitor with current depending on a difference between the input voltage and the output voltage; and
    a comparator configured to compare a voltage of the capacitor with a predetermined threshold voltage.

9. The control circuit of claim 8, wherein the charging circuit charges the capacitor with current proportional to the difference between the input voltage and the output voltage.

10. The control circuit of claim 8, wherein the charging circuit includes a transconductance amplifier having a first input terminal receiving the input voltage and a second input terminal receiving the output voltage.

11. The control circuit of claim 8, wherein the charging circuit includes:
- a reference current source configured to generate reference current;
- a first transistor which is a P channel MOSFET (Metal Oxide Semiconductor Field Effect Transistor) having a drain electrode connected to the reference current source and a source electrode to which the input voltage is applied;
- a second transistor which is a P channel MOSFET having a source electrode to which the input voltage is applied, a gate electrode connected to a gate electrode of the first transistor, and a drain electrode connected to an output terminal of the charging circuit;
- a third transistor which is a P channel MOSFET having a source electrode to which the input voltage is applied, and a gate electrode connected to the gate electrode of the first transistor; and
- a fourth transistor having a source electrode connected to a drain electrode of the third transistor, a gate electrode to which the output voltage is applied, and a drain electrode connected to the output terminal of the charging circuit.

12. The control circuit of claim 4, wherein the timer circuit includes:
- a capacitor;
- a charging circuit configured to charge the capacitor with a predetermined current;
- a variable voltage source configured to generate a threshold voltage depending on a difference between the input voltage and the output voltage; and
- a comparator configured to compare a voltage of the capacitor with the threshold voltage.

13. The control circuit of claim 12, wherein the variable voltage source generates the threshold voltage substantially inversely proportional to the difference between the input voltage and the output voltage.

14. The control circuit of claim 1, wherein the switching regulator is of a step-down type.

15. The control circuit of claim 1, wherein the control circuit is integrated on a single semiconductor substrate.

16. A switching regulator comprising a control circuit of claim 1.

17. An electronic apparatus comprising the switching regulator of claim 16.

18. A method of controlling a switching transistor and a synchronous rectifying transistor of a switching regulator, comprising:
- comparing a feedback voltage depending on an output voltage of the switching regulator with a predetermined reference voltage and asserting an on signal when the feedback voltage decreases to the reference voltage;
- asserting an off signal when current flowing into the switching transistor reaches a predetermined peak value;
- asserting the off signal after lapse of on-time having a length depending on an input voltage and an output voltage of the switching regulator after the on signal is asserted;
- asserting a zero current detection signal when current flowing into the synchronous rectifying transistor decreases to a predetermined threshold value after the off signal is asserted;
- (i) transitioning to a first state where, when the on signal is asserted, the switching transistor is turned on and the synchronous rectifying transistor is turned off, (ii) transitioning to a second state where, when the off signal is asserted, the switching transistor is turned off and the synchronous rectifying transistor is turned on, and (iii) transitioning to a third state where, when the zero current detection signal is asserted, the switching transistor and the synchronous rectifying transistor are turned off; and
- in the third state, reducing an operation current of at least a portion of a control circuit of the switching regulator until a next on signal is asserted from lapse of a predetermined standby time after the zero current detection signal is asserted.

* * * * *